United States Patent
Anderson, Jr. et al.

(10) Patent No.: US 6,773,129 B2
(45) Date of Patent: Aug. 10, 2004

(54) VEHICLE INTERIOR LIGHTING SYSTEMS USING ELECTROLUMINESCENT PANELS

(75) Inventors: James Burr Anderson, Jr., Cookeville, TN (US); John Christopher Brown, Cookeville, TN (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 10/234,217

(22) Filed: Sep. 4, 2002

(65) Prior Publication Data
US 2003/0002273 A1 Jan. 2, 2003

Related U.S. Application Data

(62) Division of application No. 09/793,205, filed on Feb. 26, 2001, now Pat. No. 6,464,381.
(60) Provisional application No. 60/185,349, filed on Feb. 26, 2000.

(51) Int. Cl.[7] .................................................. F21V 9/16
(52) U.S. Cl. .......................... 362/84; 362/85; 362/490; 362/95; 362/394
(58) Field of Search .................... 345/172 EL, 161 EL, 345/173 EL, 175 EL, 163 EL, 169 EL; 178/19.01 EL, 19.02 EL; 362/84, 85, 490, 488, 489, 492, 95, 394, 395; 200/310, 311, 312, 313

(56) References Cited

U.S. PATENT DOCUMENTS

| | | | | |
|---|---|---|---|---|
| 4,310,839 A | * | 1/1982 | Schwerdt ............... 340/712 |
| 4,668,876 A | * | 5/1987 | Skarman .................. 307/116 |
| 4,672,229 A | * | 6/1987 | Skarman et al. .......... 307/115 |
| 4,725,694 A | * | 2/1988 | Auer et al. .................. 178/18 |
| 4,896,223 A | * | 1/1990 | Todome ..................... 358/468 |
| 4,937,762 A | * | 6/1990 | Todome ..................... 364/521 |
| 5,747,756 A | * | 5/1998 | Boedecker ................. 200/5 |
| 6,013,956 A | * | 1/2000 | Anderson, Jr. ........... 307/10.1 |

FOREIGN PATENT DOCUMENTS

| | | | | |
|---|---|---|---|---|
| JP | 08045403 A | * | 2/1996 | ......... G09F/13/00 |
| JP | 09265856 A | * | 10/1997 | ......... H01H/13/02 |

* cited by examiner

Primary Examiner—Stephen Husar
Assistant Examiner—Sharon Payne
(74) Attorney, Agent, or Firm—Reising, Ethington, Barnes, Kisselle, P.C.

(57) ABSTRACT

A vehicle interior component and lighting assembly that includes a vehicle interior component having a fabric disposed over a substrate or foam layer, or both. An electroluminescent panel is located between the fabric and substrate/foam layer and directs light from the panel through the fabric. In this way, the light source can be effectively hidden when not in use and can be incorporated into the interior component in a manner that requires little space. The vehicle interior component can be any of a number of different interior articles, including, for example, a headliner, door panel, vehicle seat, rear deck, sun visor, and trunk panel. Also disclosed are vehicle interior illumination systems using touch switches and electroluminescent panels to provide back lighting of the switch and/or vehicle interior illumination through the switch.

13 Claims, 5 Drawing Sheets

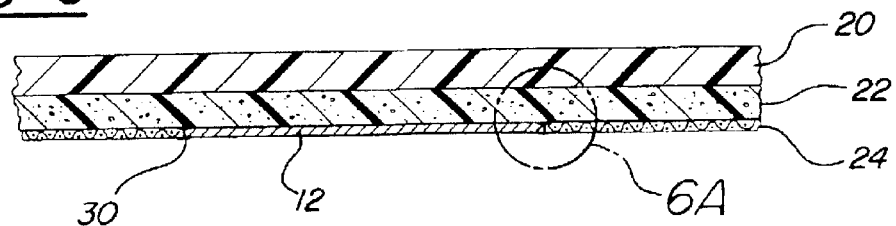
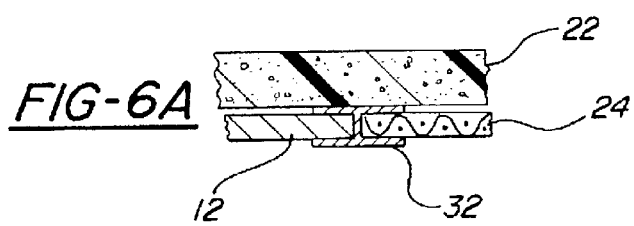
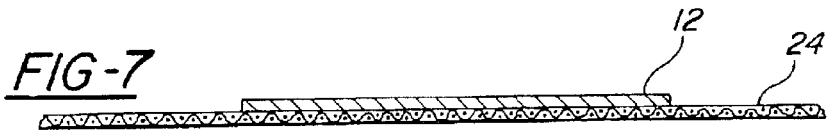
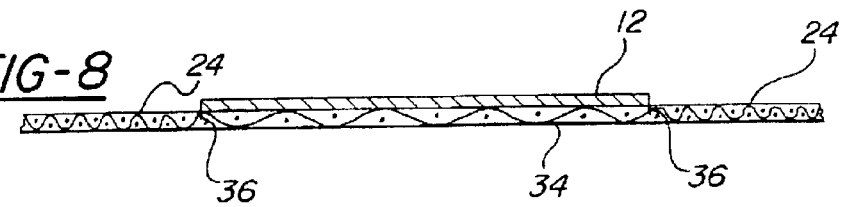
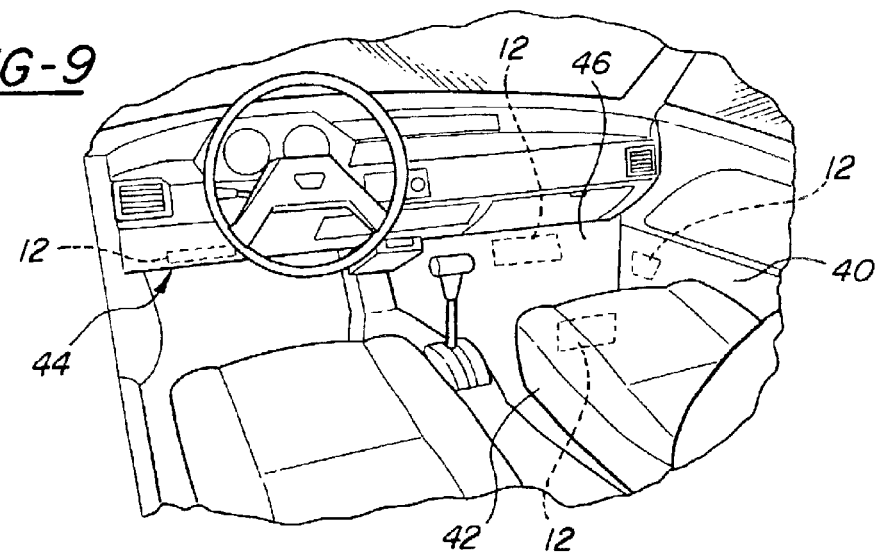

VEHICLE INTERIOR LIGHTING SYSTEMS USING ELECTROLUMINESCENT PANELS

CROSS-REFERENCE TO RELATED APPLICATION

This application is a divisional of U.S. Ser. No. 09/793,205 filed Feb. 26, 2001, now U.S. Pat. No. 6,464,381, which claims the priority of U.S. Provisional Patent Application No. 60/185,349, filed Feb. 26, 2000.

TECHNICAL FIELD

This invention relates to interior vehicle lighting systems and lighted switch assemblies used for automotive applications.

BACKGROUND OF THE INVENTION

Interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light. Although incandescent lamp systems can often be integrated into various vehicle interior trim components in a simple manner, various considerations do arise which complicates their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

This constraint on space behind the vehicle panels can be especially true with vehicle headliners where there may be little room between the headliner and roof of the vehicle. For headliners, the solution has typically been to either require more room between the headliner and roof or to utilize a light assembly that protrudes downwardly from the headliner for a short distance. Where sufficient space is available, various functional components such as electrical conduits, lamp soffits, electrical connectors, HVAC ducts, flat speakers, and head airbags can be molded into the headliner during its manufacture. See, for example, European Patent Application EP 0979760, published Feb. 16, 2000. However, where the headliner thickness is to be kept to a minimum, the use of molded-in lamp soffits may not be practical.

The use of alternative light sources, such as electroluminescent panels, has been proposed for a wide range of vehicle lighting applications. For example, U.S. Pat. No. 4,864,473 to Tokarz et al. discloses an electroluminescent panel dome lamp designed for a convertible-type automobile. The panel is mounted on a housing that is attached to the headliner of the convertible's roof. U.S. Pat. No. 5,013,967 to Hirotaka et al. discloses a detachable electroluminescent panel light source that can be located at various places about the inside of a vehicle to provide illumination. These locations include inside the trunk, at the glove compartment, and on the backside of the front seats. U.S. Pat. No. 5,564,813 to Curtindale discloses a sun visor that includes incandescent light sources to provide courtesy, reading, and vanity illumination. The patent states that electroluminescent lighting strips could be used in place of the incandescent lamps. However, while various automotive lighting uses of electroluminescent panels have been proposed, as exemplified by these patents, much of the prior art discloses the use of electroluminescent panels as a direct substitute for incandescent and/or LED lamps without taking full advantage of the unique structural features of the electroluminescent technology.

Accordingly, it is a general object of the invention to provide a vehicle interior lighting system that can be used to provide area or feature lighting in a manner that minimizes the aesthetic impact of the light source when not in use and that requires negligible space behind the interior body panel or trim component where the light source is located.

SUMMARY OF THE INVENTION

The present invention is directed to various interior vehicle assemblies that provide illumination using electroluminescent panels. In accordance with one aspect, the present invention is directed to a vehicle interior component assembly that includes a vehicle interior component having a fabric disposed over either a substrate or foam layer (or both). An electroluminescent panel is located between the fabric and substrate (or foam layer) and is configured to direct light from the panel through the fabric. In this way, the light source can be effectively hidden when not in use and can be incorporated into the interior component in a manner that requires little, if any, space behind the interior component. The vehicle interior component can be any of a number of different interior articles, including, for example, a headliner, door panel, vehicle seat, rear deck, sun visor, and trunk panel.

In accordance with another aspect of the invention, there is provided a vehicle carpet utilizing an electroluminescent panel, with the carpet including a substrate and a carpet pile attached to the substrate. The electroluminescent panel is mounted underneath the carpet pile and is configured to direct light from the panel through the carpet pile. A vehicle carpet so constructed can be used as a floor mat or as installed floor carpet.

In accordance with another aspect of the invention, there is provided a vehicle instrument panel utilizing an electroluminescent panel to provide downwardly-directed light. The instrument panel includes a lower surface that faces towards a floor area of the vehicle when installed, with the lower surface having a light-transmitting region. The electroluminescent panel is mounted within the instrument panel behind the lower surface at the light-transmitting region, and electroluminescent panel is configured to direct light from the panel through the light-transmitting region of the lower surface.

In accordance with yet another aspect of the invention, there is provided a vehicle interior illumination system that includes a light source, a switch assembly, and an electronic circuit for energizing the light source. The switch assembly includes at least one light-transmissive touch switch and an electroluminescent panel that is located behind the touch switch to provide back lighting of the touch switch upon energization by the electronic circuit. The electronic circuit is connected to the light source, touch switch, and electroluminescent panel, and is operable upon activation of the switch to energize the light source and to change energization of the electroluminescent panel.

In accordance with another aspect of the invention, there is provided a vehicle interior lighting and switch assembly, comprising a light-transmissive touch switch, a light source disposed behind the touch switch, and an electronic circuit connected to both the touch switch and light source. The light source comprises an electroluminescent panel and the circuit is operable upon activation of the touch switch to energize the electroluminescent panel to thereby provide area illumination through the touch switch. A vehicle lighting and switch assembly constructed in this manner can be used for dome lights and map lights within the vehicle.

BRIEF DESCRIPTION OF THE DRAWINGS

Preferred exemplary embodiments of the invention will hereinafter be described in conjunction with the appended drawings, wherein like designations denote like elements, and wherein:

FIGS. 3–8 depict fragmentary, cross-sectional views of the headliner of FIG. 1 showing different mounting arrangements that can be used for the electroluminescent panels;

FIG. 9 is a perspective view of an interior region of a vehicle showing vehicle seating, door panel, instrument panel, and floor carpeting assemblies that incorporate electroluminescent panels in accordance with the invention;

DETAILED DESCRIPTION OF THE PREFERRED EMBODIMENTS

Figure 1:
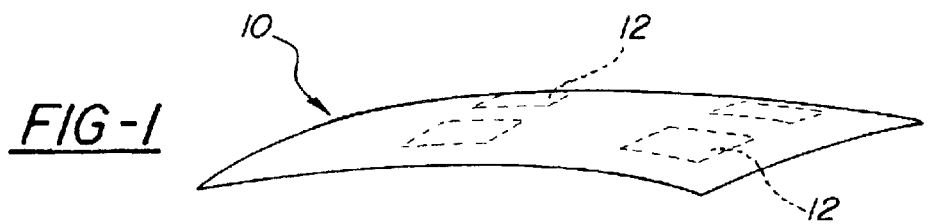
FIG. 1 is a perspective view of a vehicle headliner constructed in accordance with the present invention.

Referring to FIG. 1, there is shown an embodiment of a headliner 10 as it might be constructed in accordance with the invention. Although the following description is primarily directed to the use of the invention to provide illumination from headliner 10, it will of course be appreciated that, in its broader aspects, the invention is directed to a vehicle interior component assembly that uses one or more electroluminescent panels to provide interior vehicle illumination, and that the invention can thus be used for any of a wide variety of interior trim articles and other vehicle interior components. For example, it can be used in conjunction with door panels, instrument panels, floor carpeting, floor mats, trunk panels, occupant seating, sun visors, and rear decks, as will be described further below.

Figure 2:
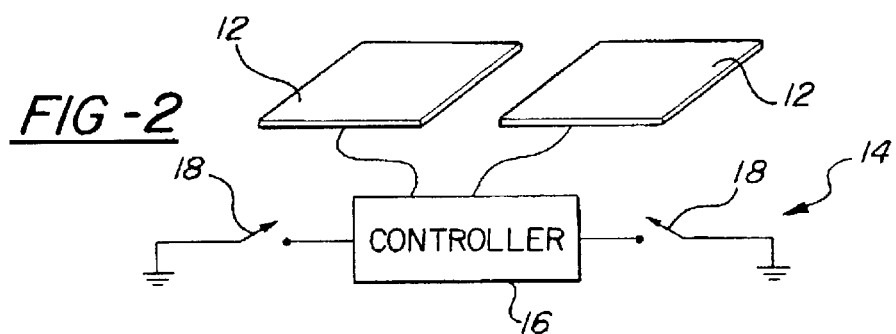
FIG. 2 is a schematic of a control circuit for operation of the electroluminescent light sources used in the headliner of FIG. 1.

To provide general area illumination at each of the four main occupant seats of a typical automotive sedan, headliner 10 includes four electroluminescent panels 12 that are spaced within headliner 10 at locations corresponding to the main occupant seats. As shown in the schematic of FIG. 2, the electroluminescent panels 12 are connected to an electronic circuit 14 that includes a controller 16 and a switch 18 for each of the panels 12. For simplicity, only two of the electroluminescent panels 12 and their corresponding switches 18 are shown. Controller 16 receives operating power from the vehicle battery (not shown) and is operable to energize each electroluminescent panel 12 independently of the other panels when its corresponding switch 18 is activated. Each switch 18 can be a manually activated switch positioned within the vehicle at a location that allows the occupant of any of the four main seats to activate the light corresponding to that seat. Of course, the switches could also be wired to a second set of switches on an operator console to permit the driver to activate, de-activate, or even block activation of any of the panels. Optionally, the panels 12 can be controlled by a vehicle computer (not shown). In this regard, the circuit 14 (or controller 16 itself) can include a timer circuit that controls the length of time that the panels 12 are illuminated. Similarly, controller 16 can also include suitable circuitry for control of the brightness level of the panels. The design and implementation of these different electrical circuits is well known to those skilled in the art and no further discussion of these circuits is therefore necessary.

As is also known by those skilled in the art, the electroluminescent panels 12 are substantially flat panels that can be formed into a variety of shapes and sizes. They are energized by suitable operating power from controller 16. The construction and use of such panels is also well known and therefore no further explanation of their construction or operation is necessary.

Figure 3:
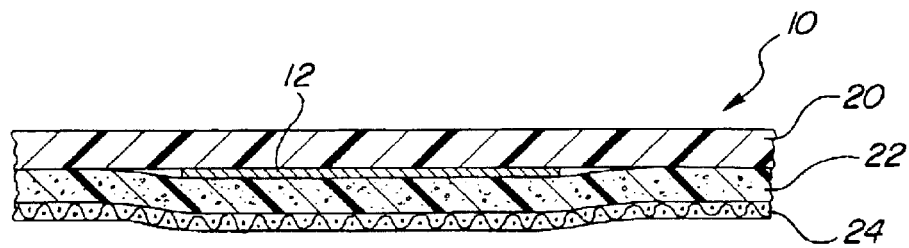

Referring now to FIGS. 3–6, there are shown a number of fragmentary, cross-sectional views of some of the different possible embodiments of one of the electroluminescent panels 12 as it can be integrated into headliner 10. Headliner 10 can be made using conventional techniques and can include three primary layers—a relatively rigid fiberglass substrate 20, an intermediate foam layer 22, and a fabric layer 24 that is exposed to the occupants for an aesthetically pleasing look and feel. As shown in FIG. 3, the electroluminescent panel 12 can be disposed between the substrate 20 and foam layer 22 with the panel oriented to direct light through foam layer 22 and fabric 24. Together these layers are typically translucent such that suitable illumination from panel 12 can be achieved.

Figure 4:
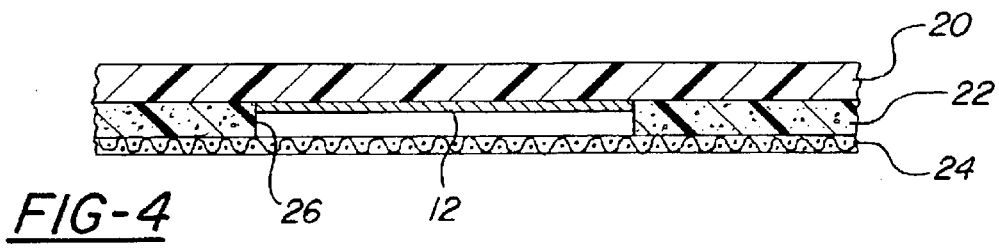

As shown in the embodiment of FIG. 4, a discontinuity or opening 26 can be formed in the foam layer 22 with the electroluminescent panel 12 attached in place within this opening. This arrangement prevents the bulging of the foam layer 22 and fabric 24 shown in FIG. 3. It also permits light transmission that is unimpeded by the foam layer 22. Although electroluminescent panel 12 is shown having a smaller thickness than foam layer 22, it will be appreciated that the relative thickness of panel 12 and foam layer 22 can be selected as appropriate for any particular vehicle application.

Figure 5:
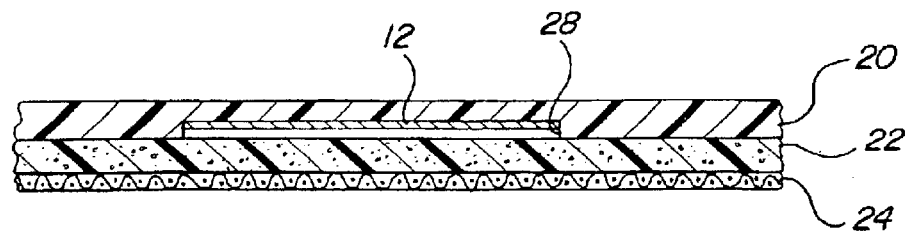

Referring to FIG. 5, the electroluminescent panel 12 can also be attached within a recessed portion 28 of substrate 20. This recess can be formed as a part of the original molding of substrate 20 and has the advantage that it helps locate the proper position of the panel 12 during assembly. Also, in instances where either substrate 20 or foam layer 22 are formed in a molding process, the panel 12 can be molded in place so that it is co-bonded to either the substrate 20, foam layer 22, or both.

FIG. 6 depicts yet another embodiment in which the panel 12 is exposed to the occupants of the vehicle by placing it onto the foam layer 22 in an opening 30 in the fabric. The fabric layer 24 can simply abut and terminate at panel 12 or, as shown in FIG. 6A, a bezel 32 can be used around the periphery of the panel 12 to provide proper fit and finish. The exposed panels can allow for many options, such as touch controls, information display, or styling features. In this regard, the panels 12 need not be used for area illumination or passenger-specific illumination. Rather, they can be used for styling features, such as a light strip that extends about the periphery of the headliner or a sun roof. The panels can also include text, vehicle logos, or other graphics that are discernable by the occupants when the panels are illuminated.

An advantage of the embodiments of FIGS. 3–5 is that, in each instance, the electroluminescent panels 12 are concealed from the vehicle occupants until illuminated. However, the embodiments of FIGS. 3 and 5 illuminate through both the foam and fabric layers, whereas the embodiment of FIG. 4 requires the formation of an opening in the foam layer 22. To maintain the concealment of the panels in a simple manner while maximizing the light illuminating down on the passengers, the arrangement of FIG. 7 can be utilized. In this embodiment, the panels 12 are each located between the fabric layer 24 and foam layer 22 (not shown). To further increase the light output, the arrangement of FIG. 8 can be used, with the panels 12 being covered by a different fabric 34 having a more open weave to increase the light throughput. The two fabrics 24 and 34 can be joined by seams 36.

As will be appreciated, by using one or more of the electroluminescent panels 12 in the headliner, mood, ambiance, reading, and general cab lighting can be provided using a light source that occupies essentially no space. Also, as shown in FIGS. 9–13, the lighting system can instead incorporate the panels onto other interior vehicle components.

More specifically, as shown in FIG. 9, the electroluminescent panels 12 can be incorporated into other fabric-surfaced interior components, such as a door panel 40 or seat riser 42. The various techniques discussed above in connection with FIGS. 3–8 for incorporating the panels into a fabric-surfaced component can be used for these applications as well. In addition to or in lieu of their use in fabric-surfaced components, the panels 12 can also be incorporated into other interior components such as an instrument panel 44 or floor carpet 46. For the instrument panel, the panel can be located at a lower surface that faces the floor area of the vehicle when the instrument is installed as shown. The lower surface has a light-transmitting region which can comprise either a translucent portion of the instrument panel or perforations of the instrument panel through which light from the electroluminescent panel is transmitted. When used with the floor carpet 46, the electroluminescent panel can be located underneath the carpet pile, either above or below the substrate on which the carpet pile is attached.

Figure 10:
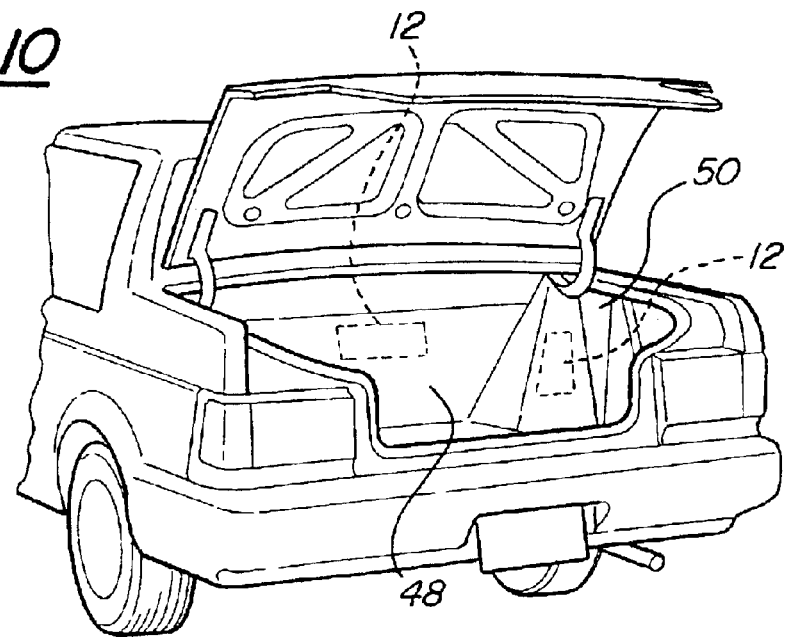
FIG. 10 is a perspective view of a vehicle trunk interior showing trunk panel assemblies that incorporate electroluminescent panels in accordance with the invention.
Figure 11:
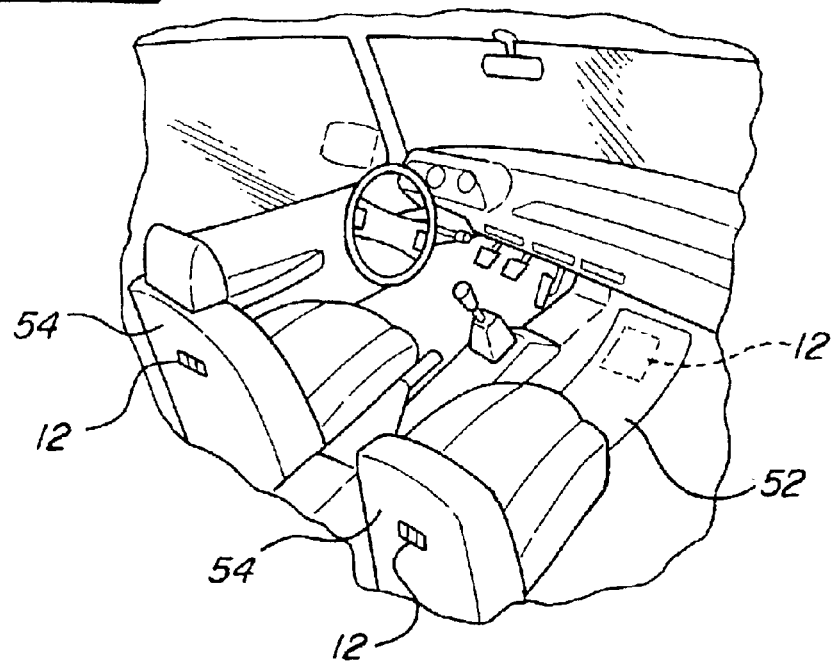
FIG. 11 is a perspective view of an interior region of a vehicle showing a floor mat assembly and a vehicle seat back assembly that incorporate electroluminescent panels in accordance with the invention.
Figure 12:
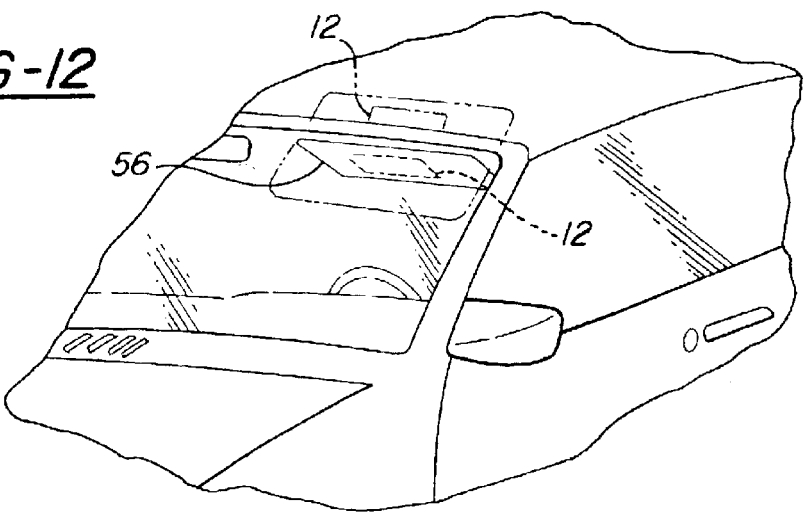
FIG. 12 is a perspective view of a sun visor assembly for a vehicle that incorporates an electroluminescent panel in accordance with the invention.
Figure 13:
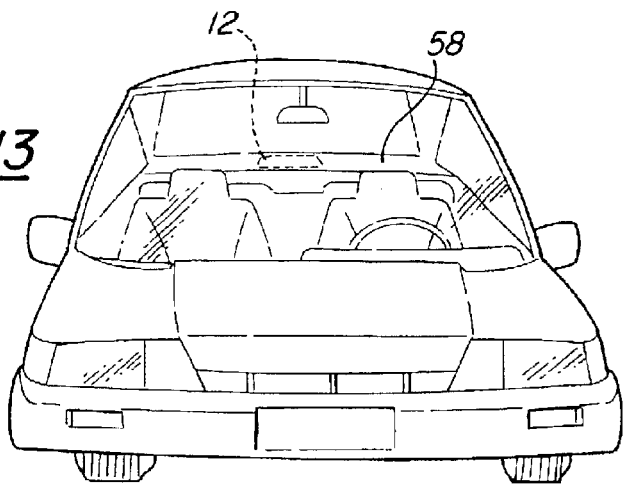
FIG. 13 is a front view of a vehicle showing a rear deck assembly that incorporates an electroluminescent panel in accordance with the invention.

As shown in FIG. 10, the electroluminescent panels 12 can be incorporated into one or more trunk panels 48, 50, using the construction techniques discussed above in connection with FIGS. 3–8. In FIG. 11, there is shown another carpet application in which the electroluminescent panel 12 is incorporated into a floor mat 52 in the same manner discussed above in connection with the floor carpet 46 of FIG. 9. Also, the panels 12 can be incorporated underneath the fabric on the seat backs 54 of the front driver and passenger side seats. In FIG. 12, there is shown a sun visor 56 which can include an electroluminescent panel 12 mounted underneath the visor fabric on either or both sides of the visor. Finally, in FIG. 13, there is shown an electroluminescent panel 12 incorporated into a rear deck 58, again underneath the fabric layer to hide its presence when not illuminated. For both the sun visor and rear deck applications, the various implementations disclosed in FIGS. 3–8 can be used.

Figure 14:
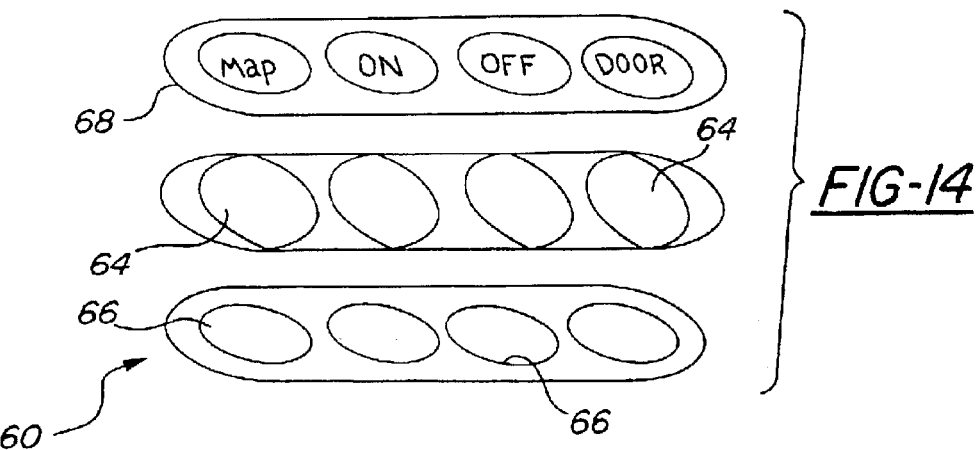
FIG. 14 is an exploded view of a preferred embodiment of lighted, touch switch assembly of the invention.
Figure 15:
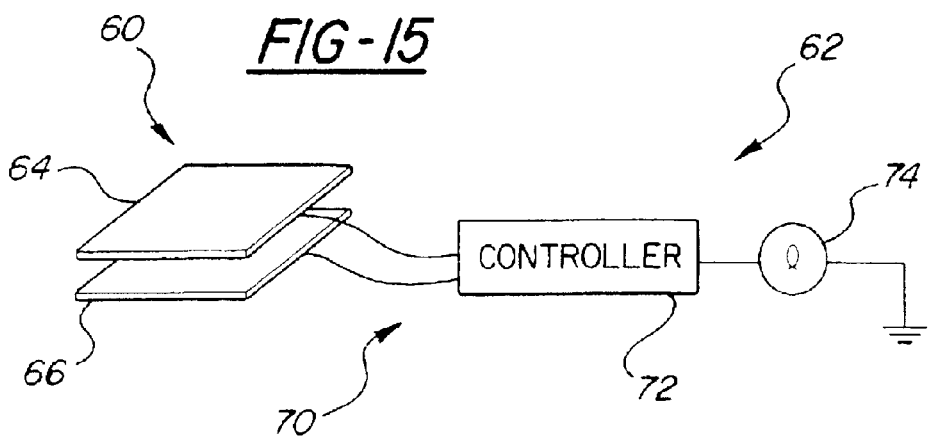
FIG. 15 is a schematic of a control circuit for the switch assembly of FIG. 14.

Turning now to FIGS. 14 and 15, a second use of electroluminescent panels for vehicle interior lighting systems will now be described. FIG. 14 is an exploded view of a lighted, touch switch assembly 60 and FIG. 15 is a schematic showing the use of a switch assembly 60 in a vehicle interior illumination system 62. Switch assembly 60 includes as its primary components a set of light-transmissive touch switches 64 and a corresponding set of electroluminescent panels 66, each of which are aligned with one of the touch switches 64 to thereby provide back lighting of the switches. Appropriate indicia can be printed on each of the touch switches to identify the function of each switch 64. Alternatively, and as shown, a light-transmissive graphics overlay 68 can be provided with the desired indicia. When assembled, the switches 64, panels 66, and overlay 68 form a backlit, low profile switch assembly having a thickness of only a few millimeters. This provides great flexibility in placement of the switch assembly within the vehicle.

The electronic circuit 70 of FIG. 15 is shown as it would be connected to a single one of the touch switches 64 and electroluminescent panels 66 of FIG. 14. The circuit 70 includes a controller 72 and light source 74 which is used to provide illumination in response to activation of its corresponding touch switch 64. Controller 72 is operable in response to activation of switch 64 to energize light source 74 and to change the energization of the panel 66 used to back-light switch 64. This change in energization of panel 66 can be, for example, switching-on of the panel so that it provides illumination of the switch 64 as an indication that the light source 74 is on. Conversely, since the activation of the light source may be self-evident, the switch 64 can be normally illuminated by operation of the panel 66 when the light source 74 is switched off, with controller 72 then changing the energization of panel 66 so that it is off when the light source 74 is switched on. In this way, the switch is illuminated and may be seen in the dark when the light source 74 is off. In yet another variation, the panel can be illuminated at different levels of energization so that, for example, it glows dimly when the light is off and brightly when it is on (or vice-a-versa). This multiple-level brightness control can also permit the brightness to be varied automatically according to ambient light levels.

Although shown symbolically as a conventional incandescent lamp, light source 74 can of course be an electroluminescent panel itself. More generally, light source 74 can instead be some other electronically-actuated device, such as a motor or solenoid, in which case its corresponding touch switch 64 can be any of the various function switches used in the vehicle, including door lock switches, window switches, etc.

Figure 16:
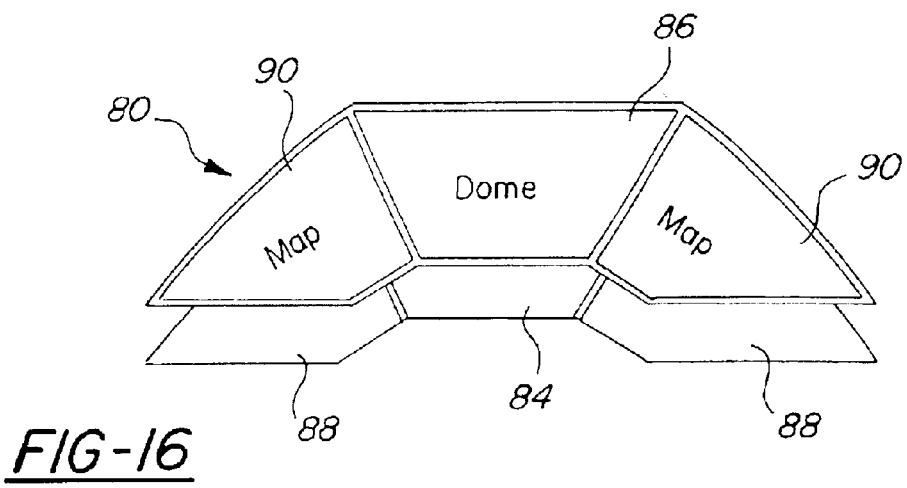
FIG. 16 is an exploded view of a preferred embodiment of a vehicle interior lighting and switch assembly of the invention.
Figure 17:
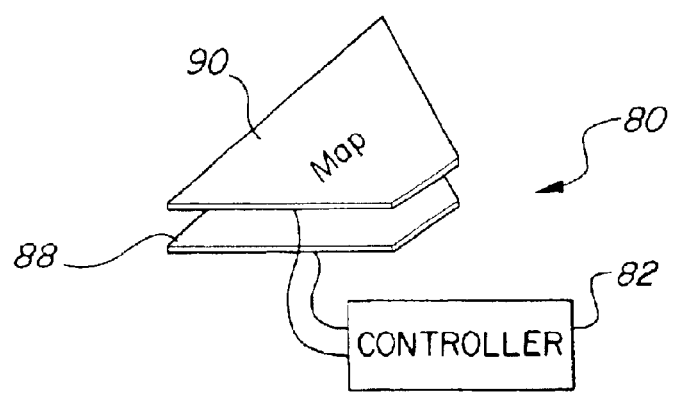
FIG. 17 is a schematic showing a controller that forms a part of the lighting and switch assembly of FIG. 16.

Turning now to FIGS. 16 and 17, a third use of electroluminescent panels for vehicle interior lighting systems will now be described. In particular, FIG. 16 depicts a vehicle interior lighting and switch assembly 80 with FIG. 17 also showing a controller 82 that is connected to and forms a part of the lighting and switch assembly 80. The assembly 80 can be mounted to a vehicle headliner (not shown) and includes a dome light and integral switch, as well as separate driver and front passenger map lights with integral switches. The dome light comprises a central electroluminescent panel 84 located underneath a light-transmissive touch switch 86 that can be manually activated by an occupant to switch on the dome light 84 via controller 82. Similarly, each of the map lights comprise an electroluminescent panel 88 located behind a corresponding touch switch 90. Only one of the map switches and lights are shown connected to the controller 82 in FIG. 17, although it will of course be understood that the other map light/switch and dome light/switch would also be connected as well. In each case, activation of one of the switches 86, 90 causes controller 82 to switch on the corresponding electroluminescent panel 84, 88 with the light from the panel transmitting though the switch and into the interior of the vehicle. The dome lamp 84 can also be separately controlled to switch on, for example, when any of the vehicle doors are opened.

It will thus be apparent that there has been provided in accordance with the present invention several vehicle interior lighting systems and lighted switch assemblies which achieve the aims and advantages specified herein. It will of course be understood that the foregoing description is of preferred exemplary embodiments of the invention and that the invention is not limited to the specific embodiments shown. Various changes and modifications will become apparent to those skilled in the art. For example, the two-layer switch/light assembly shown in FIGS. 16 and 17 can be used for other lighting applications as well, including for example reading lights for the rear occupants. All such variations and modifications are intended to come within the scope of the appended claims.

We claim:

1. A vehicle interior illumination system, comprising:
    a light source;
    a switch assembly having at least one light-transmissive touch switch, and an electroluminescent panel located directly behind said touch switch; and
    an electronic circuit connected to said light source, touch switch, and electroluminescent panel, wherein said electroluminescent panel is operable upon energization by said electronic circuit to provide back lighting of said touch switch and wherein said electronic circuit is operable upon activation of said switch to energize said light source and to change energization of said electroluminescent panel such that it affects the back lighting of said touch switch.

2. A vehicle interior illumination system as defined in claim 1, wherein said electronic circuit is operable to change energization of said electroluminescent panel upon activation of said switch by changing said electroluminescent panel from a non-energized state to an energized state in which said electroluminescent panel provides back lighting of said touch switch.

3. A vehicle interior illumination system as defined in claim 1, wherein said electronic circuit is operable to change energization of said electroluminescent panel upon activation of said switch by changing said electroluminescent panel from an energized state to non-energized state.

4. A vehicle interior illumination system as defined in claim 1, wherein said electronic circuit is operable to change energization of said electroluminescent panel upon activation of said switch by changing said electroluminescent panel from a first energized state, in which said electroluminescent panel provides a reduced light output, to a second energized state, in which said electroluminescent panel provides an increased light output.

5. A vehicle interior illumination system as defined in claim 1, wherein said switch assembly includes a plurality of light-transmissive touch switches and a corresponding plurality of electroluminescent panels disposed directly behind said touch switches for providing back lighting of at least one of said touch switches independently of at least one other of said touch switches.

6. A vehicle interior illumination system as defined in claim 1, wherein said switch assembly further comprises a graphics overlay disposed over said touch switch, said graphics overlay including indicia representing a lighting function associated with said touch switch.

7. A vehicle interior illumination system as defined in claim 1, wherein said light source comprises a map light and said touch switch comprises a map light switch.

8. A vehicle interior switch assembly comprising:
    a light-transmissive touch switch;
    a light source disposed directly behind said touch switch; and
    an electronic circuit connected to said touch switch and said light source;
    wherein said light source comprises an electroluminescent panel and said circuit is operable upon activation of said touch switch to energize said electroluminescent panel to thereby provide illumination through said touch switch;
    wherein said light source comprises a vehicle dome light and said touch switch comprises a dome light switch and wherein said vehicle interior switch assembly further comprises first and second map lights and first and second map light switches, wherein said map lights each comprise an electroluminescent panel and said map light switches each comprise a light-transmissive touch switch located directly in front of its corresponding map light, wherein said circuit is operable to energize said electroluminescent panels in response to activation of their corresponding touch switch independently of the other electroluminescent panels.

9. A vehicle interior illumination system, comprising:
    a light source;
    a switch assembly having at least one light-transmissive touch switch, and an electroluminescent panel which, when energized, provides backlightiug to said touch switch; and
    an electronic circuit connected to said light source, touch switch, and electroluminescent panel, wherein said electronic circuit is capable of controlling the energization of said electroluminescent panel to affect the back lighting to said touch switch in response to the status of said light source.

10. A vehicle interior illumination system as defined in claim 9, wherein said electronic circuit energizes said electroluminescent panel to provide back lighting to said touch switch when said light source is on.

11. A vehicle interior illumination system as defined in claim 9, wherein said electronic circuit energizes said electroluminescent panel to provide back lighting to said touch switch when said light source is off.

12. A vehicle interior illumination system as defined in claim 9, wherein said electronic circuit provides varying levels of energization to said electroluminescent panel to provide varying intensity levels of back lighting to said touch switch, said varying levels of energization depend upon the status of said light source.

13. A vehicle interior illumination system as defined in claim 12, wherein said electronic circuit provides a first level of energization to said electroluminescent panel such that it provides a first intensity level of back lighting to said touch switch when said light source is on, and said electronic circuit provides a second level of energization to said electroluminescent panel such that it provides a second intensity level of back lighting to said touch switch when said light source is off, wherein said first intensity level is greater than said second intensity level.

* * * * *